(12) United States Patent
Galvan et al.

(10) Patent No.: US 9,650,458 B2
(45) Date of Patent: May 16, 2017

(54) PROCESS FOR THE PREPARATION OF PROPYLENE TERPOLYMERS AND TERPOLYMERS OBTAINED THEREBY

(71) Applicant: BASELL POLIOLEFINE ITALIA S.R.L., Milan (IT)

(72) Inventors: Monica Galvan, Ferrara (IT); Andreas Neumann, Ferrara (IT); Tiziana Caputo, Ferrara (IT); Stefano Squarzoni, Ferrara (IT); Antonio Mazzucco, Ferrara (IT); Ofelia Fusco, Ferrara (IT); Benedetta Gaddi, Ferrara (IT); Gianni Collina, Ferrara (IT); Gisella Biondini, Ferrara (IT); Claudio Cavalieri, Ferrara (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/774,591

(22) PCT Filed: Mar. 3, 2014

(86) PCT No.: PCT/EP2014/054029
§ 371 (c)(1),
(2) Date: Sep. 10, 2015

(87) PCT Pub. No.: WO2014/139811
PCT Pub. Date: Sep. 18, 2014

(65) Prior Publication Data
US 2016/0032032 A1 Feb. 4, 2016

(30) Foreign Application Priority Data
Mar. 15, 2013 (EP) .................................... 13159360
Feb. 28, 2014 (EP) .................................... 14157186

(51) Int. Cl.
*C08F 210/06* (2006.01)
*C08F 4/646* (2006.01)
*C08F 4/649* (2006.01)
*C08F 4/654* (2006.01)

(52) U.S. Cl.
CPC .......... *C08F 210/06* (2013.01); *C08F 4/6543* (2013.01)

(58) Field of Classification Search
CPC ............................ C08F 210/06; C08F 4/6492
See application file for complete search history.

(56) References Cited

U.S. PATENT DOCUMENTS

| 6,221,984 | B1 | 4/2001 | Kersting et al. |
| 6,818,583 | B1 | 11/2004 | Morini et al. |
| 9,034,784 | B2 | 5/2015 | Standaert et al. |
| 2004/0229748 | A1 | 11/2004 | Chen et al. |
| 2005/0197456 | A1 | 9/2005 | Nicolini et al. |
| 2006/0154806 | A1 | 7/2006 | Chen et al. |
| 2010/0137505 | A1 | 6/2010 | Cavalieri et al. |
| 2012/0232221 | A1 | 9/2012 | Collina et al. |
| 2014/0046010 | A1 | 2/2014 | Guidotti et al. |

FOREIGN PATENT DOCUMENTS

| EP | 0556815 A1 | 8/1993 |
| EP | 2666793 A1 | 11/2013 |
| JP | S6395210 A | 4/1988 |
| JP | H02173016 A | 7/1990 |
| JP | H0687986 A | 3/1994 |
| JP | H11279345 A | 10/1999 |
| JP | 2006523730 A | 10/2006 |
| JP | 2007517122 A | 6/2007 |
| JP | 2009541516 A | 11/2009 |
| JP | 2010535863 A | 11/2010 |
| JP | 2011122162 A | 6/2011 |
| KR | 20120042763 A | 5/2012 |
| WO | WO-2010146074 A1 | 12/2010 |
| WO | WO-2011061134 A1 | 5/2011 |
| WO | WO-2012139897 A1 | 10/2012 |

OTHER PUBLICATIONS

PCT International Search Report and the Written Opinion—Mailed Sep. 24, 2014 for Corresponding PCT/EP2014/054029.

*Primary Examiner* — Caixia Lu

(57) ABSTRACT

Propylene terpolymers are prepared by polymerizing propylene, ethylene and an alpha-olefin selected from the group of $C_4$-$C_8$ alpha-olefins in the presence of a catalyst system obtained by contacting a solid catalyst component comprising a magnesium halide, a titanium compound having at least a Ti-halogen bond and at least two electron donor compounds one of which being present in an amount from 40 to 90% by mol with respect to the total amount of donors and selected from succinates and the other selected from 1,3 diethers, an aluminum hydrocarbyl compound, and optionally an external electron donor compound.

8 Claims, No Drawings

PROCESS FOR THE PREPARATION OF PROPYLENE TERPOLYMERS AND TERPOLYMERS OBTAINED THEREBY

This application is the U.S. National Phase of PCT International Application PCT/EP2014/054029, filed Mar. 3, 2014, claiming benefit of priority to European Patent Application No. 13159360.0, filed Mar. 15, 2013, and benefit of priority to European Patent Application No. 14157186.9 filed Feb. 28, 2014, the contents of which are incorporated herein by reference in its entirety.

FIELD OF THE INVENTION

The present invention relates to a process for the preparation of propylene terpolymers and to propylene terpolymers obtained thereby.

The propylene terpolymers obtained by the process of the present invention are suitable to be used in film applications, particularly for mono- and bi-oriented films and for heat-sealable films.

BACKGROUND OF THE INVENTION

Propylene copolymers and terpolymers have been used in film applications because, with respect to propylene homopolymers, are characterized by a better impact, lower rigidity and better transparency. It is however difficult to find an acceptable balance between those properties that are often contrasting. For example, when a certain softness is desired, that is commonly obtained in the presence of high amount of xylene-soluble fractions that make them unsuitable for food contact applications. Moreover, for heat-seal applications it is important to have a sufficiently wide processability window, i.e. the range of temperatures comprised between the melting point and the seal initiation temperature.

International application WO 2009/019169 describes a process for producing terpolymers of propylene, ethylene and other alpha-olefins in a gas-phase reactor comprising two interconnected polymerization zones. The process is carried out in the presence of conventional Ziegler-Natta catalysts comprising a phthalate-based electron donor. The obtained terpolymers show a quite good combination of properties. There still exists the need to obtain propylene terpolymers endowed with further improved properties, particularly with respect to their low seal initiation temperature with as little as possible comonomer amount coupled with a sufficiently wide processability window. It has been found that those and other results can be achieved by using a specific class of Ziegler-Natta catalysts in the preparation of propylene terpolymers.

SUMMARY OF THE INVENTION

Thus, according to a first object, the present invention provides a process for the preparation of a propylene terpolymer comprising comonomer units derived from ethylene and from an alpha-olefin selected from the group of $C_4$-$C_8$ alpha-olefins, the process comprising the step of copolymerizing propylene, ethylene and an alpha-olefin selected from the group of $C_4$-$C_8$ alpha-olefins in the presence of a catalyst system comprising the product obtained by contacting the following components:
(a) a solid catalyst component comprising a magnesium halide, a titanium compound having at least a Ti-halogen bond and at least two electron donor compounds one of which being present in an amount from 40 to 90% by mol with respect to the total amount of donors and selected from succinates and the other being selected from 1,3 diethers,
(b) an aluminum hydrocarbyl compound, and
(c) optionally an external electron donor compound.

DETAILED DESCRIPTION OF THE INVENTION

Throughout the application, the term "$C_4$-$C_8$ alpha-olefins" stands for alpha-olefins having 4 to 8 carbon atoms.

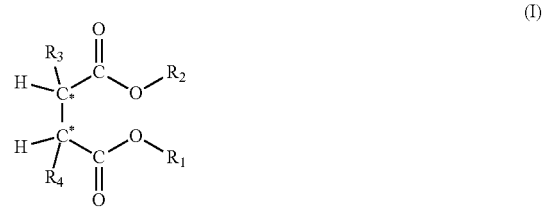

In the solid catalyst component (a) the succinate is preferably selected from succinates of formula (I):
in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, $C_3$-$C_{20}$ cycloalkyl, $C_5$-$C_{20}$ aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S)
$R^1$ and $R^2$ are preferably $C^1$-$C^8$ alkyl, cycloalkyl, aryl, arylalkyl and alkylaryl groups. Particularly preferred are the compounds in which $R^1$ and $R^2$ are selected from primary alkyls and in particular branched primary alkyls. Examples of suitable $R^1$ and $R^2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R^3$ and/or $R^4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (II):

where $R^I$ and $R^{II}$ are the same or different and are hydrogen or linear or branched $C^1$-$C^{18}$ hydrocarbon groups which can also form one or more cyclic structures; $R^{III}$ groups, equal or different from each other, are hydrogen or $C^1$-$C^{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R_I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R_I$ and $R_{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (III):

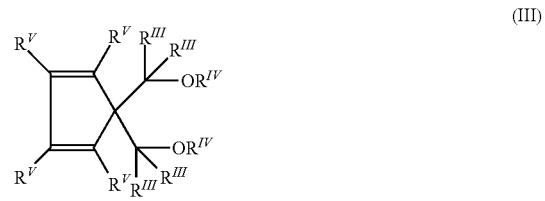

(III)

where the radicals $R^{IV}$ have the same meaning explained above and the radicals $R^{III}$ and $R_V$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R_V$ radicals can be bonded to each other to form condensed cyclic structures, saturated or unsaturated, optionally substituted with $R_{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals RV and $R_{VI}$ optionally containing one or more heteroatoms as substitutes for carbon or hydrogen atoms, or both.

Preferably, in the 1,3-diethers of formulae (I) and (II) all the $R_{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (IV):

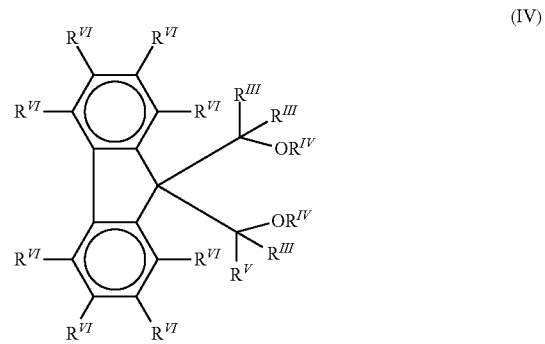

(IV)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals RIII and RIV are as defined above for formula (II). Specific examples of compounds comprised in formulae (II) and (III) are:

1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;

1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydro fluorene;
9,9-bis(methoxymethyl)-4-tert-butylfluorene.

As explained above, the catalyst component (a) comprises, in addition to the above electron donors, a titanium compound having at least a Ti-halogen bond and a Mg halide. The magnesium halide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n−1 X is halogen and R is a hydrocarbon radical having from 1 to 10 carbon atoms.

Preferably, the catalyst component (a) has an average particle size ranging from 15 to 80 µm, more preferably from 20 to 70 µm and even more preferably from 25 to 65 µm. As explained the succinate is present in an amount ranging from 40 to 90% by weight with respect to the total amount of donors. Preferably it ranges from 50 to 85% by weight and more preferably from 65 to 80% by weight. The 1,3-diether preferably constitutes the remaining amount.

The alkyl-Al compound (b) is preferably chosen among the trialkyl aluminum compounds such as for example triethylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R_5$, $R_6$, and $R_7$, are alkyl, cycloalkyl or aryl radicals with 1-18 carbon atoms optionally containing heteroatoms. Particularly preferred are diisopropyldimethoxysilane, dicyclopentyldimethoxysilane, methylcyclohexyldimethoxysilane, diphenyldimethoxysilane, methyl-t-butyldimethoxysilane, 2-ethylpiperidinyl-2-t-butyldimethoxysilane, 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 5 to 500, preferably from 5 to 400 and more preferably from 10 to 200.

The catalyst forming components can be contacted with a liquid inert hydrocarbon solvent such as, e.g., propane, n-hexane or n-heptane, at a temperature below about 60° C. and preferably from about 0 to 30° C. for a time period of from about 6 seconds to 60 minutes.

The above catalyst components (a), (b) and optionally (c) can be fed to a pre-contacting vessel, in amounts such that the weight ratio (b)/(a) is in the range of 0.1-10 and if the compound (c) is present, the weight ratio (b)/(c) is weight ratio corresponding to the molar ratio as defined above. Preferably, the said components are pre-contacted at a temperature of from 10 to 20° C. for 1-30 minutes. The precontact vessel is generally a stirred tank reactor.

Preferably, the precontacted catalyst is then fed to a prepolymerization reactor where a prepolymerization step takes place. The prepolymerization step can be carried out in a first reactor selected from a loop reactor or a continuously stirred tank reactor, and is generally carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, preferably lower than 20% by weight. Preferably, step (i) a is carried out in the absence of inert hydrocarbon solvents. The average residence time in the pre-polymerization reactor generally ranges from 2 to 40 minutes, preferably from 5 to 25 minutes. The temperature ranges between 10° C. and 50° C., preferably between 15° C. and 35° C. Adopting these conditions allows to obtain a pre-polymerization degree in the preferred range from 60 to 800 g per gram of solid catalyst component, preferably from 150 to 500 g per gram of solid catalyst component. Step (i) a is further characterized by a low concentration of solid in the slurry, typically in the range from 50 g to 300 g of solid per liter of slurry.

The slurry containing the catalyst, preferably in pre-polymerized form, is discharged from the pre-polymerization reactor and fed to a gas-phase or liquid-phase polymerization reactor. In case of a gas-phase reactor, it generally consists of a fluidized or stirred, fixed bed reactor or a reactor comprising two interconnected polymerization zones one of which, working under fast fluidization conditions and the other in which the polymer flows under the action of gravity. The liquid phase process can be either in slurry, solution or bulk (liquid monomer). This latter technology can be carried out in various types of reactors such as continuous stirred tank reactors, loop reactors or plug-flow ones. According to a particular embodiment, the polymerization is run in sequential steps whereby the product exiting the first polymerization reactor is sent to a second polymerization reactor and then possibly to further reactor(s). The polymerization is generally carried out at temperature of from 20 to 120° C., preferably of from 40 to 85° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen can be used as a molecular weight regulator.

According to another aspect, the present invention provides a terpolymer of propylene comprising comonomer units derived from ethylene and from an alpha-olefin selected from the group of $C_4$-$C_8$ alpha-olefins, preferably 1-butene, obtainable by a process comprising the step of copolymerizing propylene and ethylene in the presence of a catalyst system comprising the product obtained by contacting the following components:

(a) a solid catalyst component comprising a magnesium halide, a titanium compound having at least a Ti-halogen bond and at least two electron donor compounds one of which being present in an amount from 40 to 90% by mol with respect to the total amount of donors and selected from succinates and the other being selected from 1,3 diethers,
(b) an aluminum hydrocarbyl compound, and
(c) optionally an external electron donor compound.

The propylene terpolymers of the present invention contain preferably from 0.5 to 6% by weight, more preferably from 0.6 to 4% by weight, even more preferably from 0.7 to 3.5% by weight of ethylene units, and preferably from 2.5 to 15% by weight, more preferably from 3.5 to 13% by weight, even more preferably from 5 to 11% by weight of $C_4$-$C_8$ alpha-olefin units.

The terpolymers of the present invention have the following preferred features:
melting point (Tm) higher than 120° C., preferably ranging from 130 to 140° C.;
seal initiation temperature (SIT) ranging from 90 to 120° C.;
Tm and SIT satisfying the following relation (1):

$$Tm-SIT>25 \quad (1)$$

preferably:

$$Tm-SIT>30 \quad (1a)$$

more preferably:

$$Tm-SIT>35 \quad (1b)$$

melt flow rate (MFR) values according to ISO 1133 (230° C., 2.16 Kg) generally ranging from 0.1 to 100 g/10 min, preferably from 0.2 to 50 g/10 min;

an amount of fraction soluble in xylene generally lower than 18%, preferably lower than 16%, more preferably lower than 14%;
an amount of fraction soluble in hexane generally lower than 4.5%, preferably lower than 4.0%, more preferably lower than 3.8%.

The terpolymers of the present invention have the additional advantage that the films produced therefrom do not contain phthalate residues.

The terpolymers of the present invention can also contain additives commonly employed in the art, such as antioxidants, light stabilizers, heat stabilizers, nucleating agents, colorants and fillers. Particularly, they can comprise an inorganic filler agent in an amount ranging from 0.5 to 60 parts by weight with respect to 100 parts by weight of the said heterophasic polyolefin composition. Typical examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.5 to 5 wt % with respect to the polymer amount.

If necessary, the molecular weight of the terpolymers can be modified by visbreaking according to well-known techniques.

Preferred $C_4$-$C_8$ alpha-olefins for use in the preparation of the terpolymers of the invention are 1-butene, 1-hexene and 1-octene, the most preferred being 1-butene.

According to another aspect, the present invention provides a terpolymer of propylene, ethylene and 1-butene comprising from 0.5 to 6% by weight of ethylene units and from 2.5 to 15% by weight of 1-butene units, wherein:
a. the melting point (Tm) is higher than 131° C., and
b. the % by weight of ethylene units ($C_2$), the % by weight of 1-butene units ($C_4$), and the sealing initiation temperature (SIT) satisfy the following relation (2):

$$7(C_2)+3.2(C_4)+SIT<149 \quad (2)$$

preferably $$7(C_2)+3.2(C_4)+SIT\leq148 \quad (2a)$$

more preferably $$7(C_2)+3.2(C_4)+SIT\leq147 \quad (2b)$$

even more preferably $$7(C_2)+3.2(C_4)+SIT\leq146 \quad (2c)$$

Selected terpolymers according to the invention satisfy the relation:

$$7(C_2)+3.2(C_4)+SIT\leq145 \quad (2d)$$

and even $$7(C_2)+3.2(C_4)+SIT\leq144 \quad (2e).$$

The sign "≤" stands for "less than or equal to".

The melting point (Tm) of the terpolymers of propylene, ethylene and 1-butene according to the present invention is preferably higher than 132° C., more preferably higher than 133° C. According to another aspect, the present invention provides a terpolymer of propylene comprising comonomer units derived from ethylene and from an alpha-olefin selected from the group of $C_4$-$C_8$ alpha-olefins, preferably 1-butene, wherein the intrinsic viscosity of the xylene-soluble fraction (XSIV) is higher than 0.7 dL/g, preferably higher than 0.8 dL/g.

It has been found that in the terpolymers of the invention in which the alpha-olefin is 1-butene, the amount of 1-butene units in the xylene-soluble fraction ($C_4XS$) is higher with respect to conventional terpolymers having the same comonomers amounts.

Therefore, according to still another aspect, the present invention provides a terpolymer of propylene comprising comonomer units derived from ethylene and from 1-butene, wherein the % of 1-butene units in the xylene-soluble fraction ($C_4XS$) and the % of ethylene units in the terpolymer ($C_4TOT$), both determined via $_{13}C$-NMR analysis, satisfy the following relation:

$$C_4XS/C_4TOT>1.8 \tag{3}$$

preferably $$C_4XS/C_4TOT>2.0 \tag{3a}$$

It has also been found that in the terpolymers of the invention the amount of ethylene units in the xylene-soluble fraction ($C_2XS$) is lower with respect to conventional terpolymers having the same comonomers amounts.

Therefore, according to a further aspect, the present invention provides a terpolymer of propylene comprising comonomer units derived from ethylene and from an alpha-olefin selected from the group of $C_4$-$C_8$ alpha-olefins, preferably 1-butene, wherein the % of ethylene units in the xylene-soluble fraction ($C_2XS$) and the % of ethylene units in the terpolymer ($C_2TOT$), both determined via 13C-NMR analysis, satisfy the following relation:

$$C_2XS/C_2TOT<3.5 \tag{4}$$

preferably:

$$C_2XS/C_2TOT<3.0 \tag{4a}$$

According to a still further aspect, the present invention provides a terpolymer of propylene, ethylene and 1-butene comprising from 0.5 to 6% by weight of ethylene units and from 2.5 to 15% by weight of 1-butene units, wherein the intrinsic viscosity of the xylene-insoluble fraction (XIIV) and intrinsic viscosity of the xylene-soluble fraction (XSIV) satisfying the following relation:

$$XIIV/XSIV<3.0 \tag{5}$$

preferably:

$$XIIV/XSIV<2.8 \tag{5a}$$

more preferably:

$$XIIV/XSIV<2.5 \tag{5b}$$

According to a still further aspect, the present invention provides a terpolymer of propylene, ethylene and 1-butene comprising from 0.5 to 6% by weight of ethylene units and from 2.5 to 15% by weight of 1-butene units, wherein the intrinsic viscosity of the xylene-soluble fraction (XSIV) and intrinsic viscosity of the final terpolymer (IV) satisfying the following relation:

$$XSIV/IV>0.35 \tag{6}$$

preferably:

$$XSIV/W>0.40 \tag{6a}$$

According to a still further aspect, the present invention provides a terpolymer of propylene, ethylene and 1-butene comprising from 0.5 to 6% by weight of ethylene units and from 2.5 to 15% by weight of 1-butene units, wherein the intrinsic viscosity of the xylene-soluble fraction (XSIV) and intrinsic viscosity of the final terpolymer (IV) satisfying the following relation:

$$XSIV \times XS/IV>3.0 \tag{7}$$

preferably:

$$XSIV \times XS/IV>3.5 \tag{7a}$$

The propylene terpolymers according to the invention contain preferably from 0.5 to 6% by weight, more preferably from 0.6 to 4% by weight, even more preferably from 0.7 to 3.5% by weight of ethylene units. They contain preferably from 2.5 to 15% by weight, more preferably from 3.5 to 13% by weight, even more preferably from 5 to 11% by weight of 1-butene units.

According to an embodiment, the terpolymers of propylene, ethylene and 1-butene according to the invention contain from 1.7 to 3.5% by weight, preferably from 1.5 to 3.2% by weight of ethylene units, and from 4.5 to 10.0% by weight, preferably from 5.0 to 9.0% by weight of 1-butene units.

According to another embodiment, the terpolymers of propylene, ethylene and 1-butene according to the invention contain from 0.6 to 1.4% by weight, preferably from 0.8 to 1.2% by weight of ethylene units, and from 8.0 to 12.0% by weight, preferably from 9.0 to 11.0% by weight of 1-butene units.

The terpolymers of the present invention can be used to prepare films endowed with excellent sealing behavior. Thus, another object of the invention is a film obtained from a terpolymer of propylene comprising comonomer units derived from ethylene and from an alpha-olefin selected from the group of $C_4$-$C_8$ alpha-olefins, obtainable by a process comprising the step of copolymerizing propylene, ethylene and an alpha-olefin selected from the group of $C_4$-$C_8$ alpha-olefins in the presence of a catalyst system comprising the product obtained by contacting the following components:

(a) a solid catalyst component comprising a magnesium halide, a titanium compound having at least a Ti-halogen bond and at least two electron donor compounds one of which being present in an amount from 40 to 90% by mol with respect to the total amount of donors and selected from succinates and the other being selected from 1,3 diethers,
(b) an aluminum hydrocarbyl compound, and
(c) optionally an external electron donor compound.

The alpha-olefin selected from the group of $C_4$-$C_8$ alpha-olefins is preferably 1-butene. Of particular interest are the films obtained from a terpolymer of propylene, ethylene and 1-butene comprising from 0.5 to 6% by weight of ethylene units and from 2.5 to 15% by weight of 1-butene units, wherein c. the melting point (Tm) is higher than 131° C., and
d. the % by weight of ethylene units ($C_2$), the % by weight of 1-butene units ($C_4$), and the sealing initiation temperature (SIT) satisfy the following relation:

$$7(C_2)+3.2(C_4)+SIT \leq 150$$

The thus obtained films, due to their excellent sealing properties, good optical properties and good shrinkage behavior and softness, are suitable for use in cast films, mono- and bi-oriented films and heat-sealable films.

The following examples are given to illustrate the present invention without any limiting purpose.

EXAMPLES

Methods
Molar Ratio of Feed Gases
Determined by gas-chromatography.
Average Particle Size of the Adduct and Catalysts
Determined by a method based on the principle of the optical diffraction of monochromatic laser light with the "Malvern Instr. 2600" apparatus. The average size is given as P50.
Comonomer Content (IR)
The content of comonomers was determined by infrared spectroscopy by collecting the IR spectrum of the sample vs. an air background with a Fourier Transform Infrared spectrometer (FTIR). The instrument data acquisition parameters were:
  purge time: 30 seconds minimum
  collect time: 3 minutes minimum
  apodization: Happ-Genzel
  resolution: 2 cm$^{-1}$.
Sample Preparation—Using a hydraulic press, a thick sheet was obtained by pressing about 1 gram of sample between two aluminum foils. A small portion was cut from this sheet to mold a film of thickness ranging between 0.02 and 0.05 cm (8-20 mils). Pressing conditions were 180±10° C. (356° F.) and about 10 kg/cm2 (142.2 PSI) pressure for about one minute. The pressure was then released, the sample removed from the press and cooled to room temperature. The spectrum of pressed film sample was recorded in absorbance vs. wavenumbers (cm-1). The following measurements were used to calculate ethylene and 1-butene content:
  Area (At) of the combination absorption bands between 4482 and 3950 cm$^{-1}$ used for spectrometric normalization of film thickness;
  Area (AC2) of the absorption band between 750-700 cm$^{-1}$ after two proper consecutive spectroscopic subtractions of an isotactic non-additivated polypropylene spectrum and then of a reference spectrum of an 1-butene-propylene random copolymer in the range 800-690 cm$^{-1}$;
  Height (DC4) of the absorption band at 769 cm$^{-1}$ (maximum value), after two proper consecutive spectroscopic subtractions of an isotactic non-additivated polypropylene spectrum and then of a reference spectrum of an ethylene-propylene random copolymer in the range 800-690 cm$^{-1}$.

In order to calculate the ethylene and 1-butene content, calibration straights lines for ethylene and 1-butene obtained by using samples of known amount of ethylene and 1-butene are needed:

Calibration for ethylene—A calibration straight line is obtained by plotting AC2/At versus ethylene molar percent (% C2m). The slope GC2 is calculated from a linear regression.

Calibration for 1-butene—A calibration straight line is obtained by plotting DC4/At versus butene molar percent (% C4m). The slope GC4 is calculated from a linear regression.

The spectra of the unknown samples are recorded and then (At), (AC2) and (DC4) of the unknown sample are calculated. The ethylene content (% molar fraction C2m) of the sample was calculated as follows:

$$\%C2m = \frac{1}{G_{C2}} \cdot \frac{A_{C2}}{A_t}$$

The 1-butene content (% molar fraction C4m) of the sample was calculated as follows:

$$\%C4m = \frac{1}{G_{C4}} \cdot \left(\frac{A_{C4}}{A_t} - I_{C4}\right)$$

The propylene content (molar fraction C3m) was calculated as follows:

$$C3m = 100 - \% C4m - \% C2m$$

The ethylene, 1-butene contents by weight were calculated as follows:

$$\%C2wt = 100 \cdot \frac{28 \cdot C2m}{(56 \cdot C4m + 42 \cdot C3m + 28 \cdot C2m)}$$

$$\%C4wt = 100 \cdot \frac{56 \cdot C4m}{(56 \cdot C4m + 42 \cdot C3m + 28 \cdot C2m)}$$

Comonomer Content (NMR)

For determining the content of comonomers via $^{13}$C-NMR analysis, it was worked according to the following procedure. $^{13}$C NMR spectra were acquired on a Bruker AV600 spectrometer equipped with cryo probe, operating 150.91 MHz in the Fourier transform mode at 120° C. The peak of the $S_{\delta\delta}$ carbon (nomenclature according C. J. Carman, R. A. Harrington and C. E. Wilkes, Macromolecules, 10, 3, 536 (1977)) was used as internal reference at 29.9 ppm. About 30 mg of sample were dissolved in 0.5 ml of 1,1,2,2 tetrachloro ethane d$_2$ at 120° C. w. Each spectrum was acquired with a 90° pulse, 15 seconds of delay between pulses and CPD to remove $^1$H-$^{13}$C coupling. 512 transients were stored in 65 K data points using a spectral window of 9000 Hz. Triad distribution was obtained using the following relations:

$$XPX = 100I_8/\Sigma$$

$$XPE = 100I_5/\Sigma$$

$$EPE = 100I_4/\Sigma$$

$$XBX = 100I_3/\Sigma$$

$$XBE = 100I_2/\Sigma$$

$$XEX = 100I_9/\Sigma$$

$$XEE = 100I_1/\Sigma$$

$$EEE = 100(0.5I_7 + 0.25I_6)/\Sigma$$

wherein:

$$\Sigma = I_8 + I_5 + I_4 + I_3 + I_2 + I_9 + I_1 + 0.5I_7 + 0.25I_6;$$

I are the areas of the corresponding carbon as reported in Table 1;
and X can be propylene or 1-butene.

The molar content of ethylene (E), propylene (P) and 1-butene (B) is obtained from triads using the following relations:

$$P(m\%) = XPX + XPE + EPE$$

$$B(m\%) = XBX + XBE + EBE$$

$$E(m\%) = EEE + XEE + XEX$$

Molar content was transformed in weight content using monomers molecular weight.

| Assignments of the $^{13}$C NMR spectrum of Ethylene/Propylene/1-Butene terpolymers | | | |
|---|---|---|---|
| Number | Chemical Shift (ppm) | Carbon | Sequence |
| 1 | 37.64-37.35 | $S_{\alpha\delta}$ | PEE |
| 2 | 37.35-37.15 | $T_{\beta\delta}$ | XBE |
| 3 | 35.27-34.92 | $T_{\beta\beta}$ | XBX |
| 4 | 33.29-33.15 | $T_{\delta\delta}$ | EPE |
| 5 | 30.93-30.77 | $T_{\beta\delta}$ | XPE |
| 6 | 30.35-30.26 | $S_{\gamma\delta}$ | PEEE |
| 7 | 29.97-29.85 | $S_{\delta\delta}$ | EEE |
| 8 | 29.14-28.31 | $T_{\beta\beta}$ | XPX |
| 9 | 24.88-24.14 | $S_{\beta\beta}$ | XEX |

Melt Flow Rate (MFR "L")

Determined according to ISO 1133 (230° C., 2.16 Kg)

Melting Point (Tm)

The melting point or melting temperature was determined by differential scanning calorimetry (DSC) according to the ASTM D 3417 method, which is equivalent to the ISO 11357/1 and 3 method.

Sealing Initiation Temperature (S.I.T.)

A 50 μm cast film was prepared from the obtained propylene terpolymers by extrusion by means of a single screw Collin extruder (30 mm D, 25 L/D) at a film drawing speed of 7 m/min and a melt temperature of 210-250° C. The resulting film was overlapped to a 1000 μm thick sheet of polypropylene homopolymer having an isotacticity index of 97% and a MFR L of 2 g/10 min. The overlapped films were then bonded each other by means of a compression molding Collin press at 200° C. under a 35 Kg/cm² pressure maintained for 5 minutes. The resulting plaques were stretched longitudinally and transversally, i.e. biaxially, by a factor 7 with a Brueckner film stretcher at 160° C., thus obtaining a 20 μm thick film (18 μm homopolymer+2 μm testing material). 2×5 cm specimens were then cut from the obtained stretched film. For each test, two cast film specimens were overlapped and then sealed along one of the 5 cm sides with a Brugger Feinmechanik Sealer, model HSG-ETK 745. Sealing time was 5 seconds at a pressure of 20 psi. The sealing temperature was increased for each seal, starting from about 10° C. less than the melting temperature of the test composition. The sealed samples were left to cool, cut 2 cm width and then their unsealed ends were attached to an Instron machine where they were tested at a traction speed of 50 mm/min. The S.I.T. is defined as the temperature at which five of six specimens tested have a force ≥2N.

Xylene Solubles (XS)

Determined as follows: 2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Hexane Solubles

Determined according to FDA 177.1520, by suspending in an excess of hexane a 100 μm thick film specimen of the composition being analyzed, in an autoclave at 50° C. for 2 hours. The hexane is then removed by evaporation and the dried residue is weighed.

Intrinsic Viscosity (IV)

The sample is dissolved by tetrahydronaphtalene at 135° C. and then it is poured into the capillary viscometer. The viscometer tube (Ubbelohde type) is surrounded by a cylindrical glass jacket; this setup allows temperature control with a circulating thermostated liquid. The downward passage of the meniscus is timed by a photoelectric device. The passage of meniscus in front of the upper lamp starts the counter which has a quartz crystal oscillator. The meniscus stops the counter as it passes the lower lamp and the efflux time is registered: this is converted into a value of intrinsic viscosity through Huggin's equation, provided that the flow time of the pure solvent is known at the same experimental conditions (same viscometer and same temperature). One single polymer solution is used to determine $[\eta]$.

Examples 1-2

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.1C_2H_5OH$ having average particle size of 47 μm (prepared in accordance with the method described in example 1 of EP728769) and an amount of diethyl 2,3-diisopropylsuccinate ($1^{st}$ internal donor—succinate) such as to have a Mg/succinate molar ratio of 15 were added. The temperature was raised to 100° C. and kept at this value for 60 min. After that the stirring was stopped and the liquid was siphoned off. After siphoning, fresh $TiCl_4$ and an amount of 9,9-bis(methoxymethyl)fluorene ($2^{nd}$ internal donor—diether) such as to have a Mg/diether molar ratio of 30 were added. Then the temperature was raised to 110° C. and kept for 30 minutes under stirring. After sedimentation and siphoning at 85° C., fresh $TiCl_4$ was added. Then the temperature was raised to 90° C. for 15 min. After sedimentation and siphoning at 90° C. the solid was washed six times with anhydrous hexane (6×100 ml) at 60° C. The obtained solid catalyst component had a total amount of internal electron donor compounds of 12.0% by weight with respect to the weight of the solid catalyst component.

Preparation of the Catalyst System—Precontact

Before introducing it into the polymerization reactors, the solid catalyst component described above is contacted with aluminum-triethyl (TEAL) and with di-iso-propyl-di-metoxy-silane (DIPMS) under the conditions reported in Table 1.

Prepolymerization

The catalyst system is then subject to prepolymerization treatment at 20° C. by maintaining it in suspension in liquid propylene for a residence time of 9 minutes before introducing it into the polymerization reactor.

Polymerization

The polymerization was carried out in gas-phase polymerization reactor comprising two interconnected polymerization zones, a riser and a downcomer, as described in European Patent EP782587. Hydrogen was used as molecular weight regulator. The polymer particles exiting from the polymerization step were subjected to a steam treatment to remove the unreacted monomers and dried under a nitrogen flow.

The main precontact, prepolymerization and polymerization conditions and the molar ratios of monomers and hydrogen fed to the polymerization reactor are reported in Table 1. Polymer and film characterization data are reported in Table 2.

Example 3

It was worked according to the procedure described for examples 1-2, except that di-cyclopentyl-di-metoxy-silane was used in place of di-iso-propyl-di-metoxy-silane. Process conditions are reported in Table 1 and polymer/film characterization data are reported in Table 2.

Example 4C (Comparative)

Example 3 of WO 2009/019169.

TABLE 1

Polymerization conditions

| Example | 1 | 2 | 3 |
|---|---|---|---|
| Precontact | | | |
| Temperature (° C.) | 15 | 15 | 15 |
| Residence time (min) | 14 | 14 | 12 |
| Catalyst (g/h) | 2.3 | 3.3 | 9.3 |
| Teal (g/h) | 17 | 20 | 80 |
| Teal/donor ratio (g/g) | 3.5 | 3.2 | 4.0 |
| Prepolymerization | | | |
| Temperature (° C.) | 30 | 30 | 30 |
| Residence time (min) | 8.5 | 6.3 | 9.0 |
| Prepolymerization degree (g pol./g cat.) | 300 | 300 | 300 |
| Polymerization | | | |
| Temperature (° C.) | 72 | 71 | 71 |
| Pressure (barg) | 24 | 21 | 21 |
| Residence time (min) | 80 | 80 | 119 |
| $C_2^-/C_2^- + C_3^-$ (mol/mol) | 0.017 | 0.007 | 0.01 |
| $C_4^-/C_4^- + C_3^-$ (mol/mol) | 0.075 | 0.15 | 0.18 |
| $H_2/C_3^-$ (mol/mol) | 0.01 | 0.044 | 0.035 |

TABLE 2

Polymer and film characterization

| Example | | 1 | 2 | 3 | 4C |
|---|---|---|---|---|---|
| Ethylene content (IR) | % | 2.1 | 0.9 | 0.8 | 1.2 |
| 1-Butene content (IR) | % | 4.8 | 9.7 | 10.8 | 11.3 |
| MFR "L" | g/10' | 5.2 | 4.0 | 7 | 5.1 |
| Melting point (Tm) | ° C. | 135.3 | 134.6 | 133.3 | 130.4 |
| S.I.T. | ° C. | 113 | 108 | 105 | 107.4 |
| 7(C$_2$) + 3.2(C$_4$) + SIT | | 143.06 | 145.34 | 146.16 | 151.96 |
| Xylene solubles | wt % | 6.9 | 9.2 | 12.2 | 19.6 |
| Hexane solubles | wt % | 1.7 | 2.8 | 3.2 | 2.8 |

Examples 5-10

Preparation of the Solid Catalyst Component

It was worked according to the procedure described for examples 1-2, except that the average particle size of microspheroidal support was 61 µm and that the molar ratio between Mg and the total amount of internal donors (ID) was Mg/ID=7, the relative molar ratio between succinate and diether being the same as in examples 1-2.

Preparation of the Catalyst System—Precontact

Before introducing it into the polymerization reactors, the solid catalyst component described above is contacted with aluminum-triethyl (TEAL) and with di-iso-propyl-di-metoxy-silane (DIPMS) under the conditions reported in Table 3.

Prepolymerization

The catalyst system is then subject to prepolymerization treatment at 15° C. by maintaining it in suspension in liquid propylene for a residence time of 32+36 minutes before introducing it into the polymerization reactor.

Polymerization

Into a first gas phase polymerization reactor a propylene polymer is produced by feeding in a continuous and constant flow the prepolymerized catalyst system, hydrogen (used as molecular weight regulator), propylene and ethylene in the gas state. The polymer produced in the first reactor is discharged in a continuous flow and, after purging of unreacted monomers, introduced in a continuous flow into a second gas phase polymerization reactor, together with quantitatively constant flows of hydrogen, ethylene, propylene and 1-butene in the gas state. The polymer particles exiting from the polymerization step were subjected to a steam treatment to remove the unreacted monomers and dried under a nitrogen flow.

The main precontact, prepolymerization and polymerization conditions and the molar ratios of monomers and hydrogen fed to the polymerization reactors are reported in Table 3. Polymer and film characterization data are reported in Table 4.

Example 11C (Comparative)

It was worked according to the procedure of examples 5-10, except that the solid catalyst component was prepared as follows. Into a 500 mL four-necked round flask, purged with nitrogen, 250 mL of TiCl$_4$ were introduced at 0° C. While stirring, 20.0 g of microspheroidal MgCl$_2$.1.8C$_2$H$_5$OH having average particle size of 63 µm (prepared in accordance with the method described in example 1 of EP728769), an amount of diisobutylphthalate such as to have a Mg/phthalate molar ratio of 6 was added. The temperature was raised to 100° C. and kept at this value for 60 min. Then, the stirring was stopped, the solid was sedimented and the liquid siphoned off at 100° C. After siphoning, fresh TiCl$_4$ and an amount of diisobutylphthalate such as to have a Mg/phthalate molar ratio of 14 was added. Then the temperature was raised to 110° C. and kept for 30 minutes under stirring. After sedimentation and siphoning at 100° C., fresh TiCl4 was added. Then the temperature was raised to 120° C. for 30 min. After sedimentation and siphoning at 100° C. another treatment with TiCl$_4$ at 120° C. for 30' was carried out. After sedimentation and siphoning at 100° C., the solid was washed six times with anhydrous hexane (7×100 ml) at 60° C.

The main precontact, prepolymerization and polymerization conditions and the molar ratios of monomers and hydrogen fed to the polymerization reactors are reported in Table 3. Polymer and film characterization data are reported in Table 4.

TABLE 3

Polymerization conditions

| Example | 5 | 6 | 7 | 8 | 9 | 10 | 11C |
|---|---|---|---|---|---|---|---|
| Precontact | | | | | | | |
| Temperature (° C.) | 15 | 15 | 15 | 15 | 15 | 15 | 15 |
| Residence time (min) | 9 | 9 | 9 | 9 | 9 | 9 | 9 |
| Catalyst (g/h) | 9.9 | 10 | 10.1 | 10.1 | 6.4 | 10.5 | 9.7 |
| Teal (g/h) | 40.2 | 39.8 | 40 | 39.9 | 28.3 | 39.9 | 40 |
| Teal/donor ratio (g/g) | 3 | 3.1 | 3 | 3 | 10.1 | 3 | 3.9 |
| Prepolymerization | | | | | | | |
| Temperature (° C.) | 15 | 15 | 15 | 15 | 15 | 15 | 15 |
| Residence time (min) | 32 | 32 | 36 | 32 | 32 | 36 | 32 |
| Prepolymerization degree (g pol./g cat.) | 230 | 191 | 266 | 210 | 232 | — | 123 |
| Polymerization 1st reactor | | | | | | | |
| Temperature (° C.) | 70 | 70 | 70 | 70 | 70 | 70 | 70 |
| Pressure (barg) | 16 | 18 | 16 | 16 | 18 | 16 | 16 |
| Residence time (min) | 48 | 55 | 60 | 44 | 54 | 58 | 46 |
| $C_2^-/C_2^- + C_3^-$ (mol/mol) | 0.026 | 0.025 | 0.028 | 0.027 | 0.025 | 0.029 | 0.029 |
| $H_2/C_3^-$ (mol/mol) | 0.012 | 0.0098 | 0.007 | 0.013 | 0.0088 | 0.007 | 0.018 |
| Polymerization 2nd reactor | | | | | | | |
| Temperature (° C.) | 70 | 70 | 70 | 70 | 70 | 70 | 70 |
| Pressure (barg) | 16 | 16 | 16 | 16 | 16 | 16 | 16 |
| Residence time (min) | 61 | 57 | 46 | 53 | 50 | 44 | 51 |
| $C_2^-/C_2^- + C_3^-$ (mol/mol) | 0.026 | 0.024 | 0.022 | 0.018 | 0.017 | 0.017 | 0.034 |
| $C_4^-/C_4^- + C_3^-$ (mol/mol) | 0.18 | 0.172 | 0.202 | 0.192 | 0.184 | 0.24 | 16 |

TABLE 4

Polymer and film characterization

| Example | | 5 | 6 | 7 | 8 | 9 | 10 | 11C |
|---|---|---|---|---|---|---|---|---|
| Ethylene content (IR) | % | 3.4 | 3.1 | 2.6 | 2.2 | 2.1 | 2.0 | 3.2 |
| 1-Butene content (IR) | % | 5.8 | 5.5 | 7.2 | 7.5 | 7.1 | 8.7 | 6.1 |
| MFR "L" | g/10' | 5 | 5 | 6 | 5 | 5 | 6 | 5.5 |
| Melting point (Tm) | ° C. | 136 | 133 | 136 | 135 | 138 | 136 | 133 |
| S.I.T. | ° C. | 102 | 103 | 99 | 102 | 100 | 93 | 101 |
| $7(C_2) + 3.2(C_4) + SIT$ | | 144.36 | 142.3 | 140.24 | 141.4 | 137.42 | 134.84 | 142.9 |
| Xylene Solubles (XS) | wt % | 10.8 | 8.7 | 10.8 | 8.2 | 8.9 8.0 | 11.5 | 6.8 |
| $C_2$TOT (NMR) | % | 3 | 3 | 2.5 | 2 | 2 | 2 | 3.1 |
| $C_4$TOT (NMR) | % | 7.2 | 6.6 | 8.8 | 8.9 | 8.1 | 8.6 | 6.6 |
| $C_2$XS (NMR) | % | 9.2 | 8.2 | 6.7 | 6.1 | 7.4 | 5 | 11.8 |
| $C_4$XS (NMR) | % | 14 | 13.5 | 19.2 | 19.6 | 16.1 | 32.2 | 10.2 |
| $C_2$XI (NMR) | % | 2.5 | 2.6 | 2 | 2 | 1.9 | 1.8 | 2.7 |
| $C_4$XI (NMR) | % | 6.7 | 6 | 7.2 | 7.8 | 7.4 | 8.1 | 6.4 |
| $C_2$XS/$C_2$TOT | | 3.1 | 2.7 | 2.7 | 3.0 | 3.7 | 2.5 | 3.8 |
| $C_4$XS/$C_4$TOT | | 1.9 | 2.0 | 2.2 | 2.2 | 2.0 | 3.7 | 1.5 |
| XIIV | dL/g | 1.96 | 1.93 | 1.89 | 1.90 | 1.94 | 1.90 | 1.84 |
| XSIV | dL/g | 0.93 | 0.91 | 0.81 | 0.83 | 0.72 | 0.89 | 0.61 |
| XIIV/XSIV | | 2.1 | 2.1 | 2.3 | 2.3 | 2.7 | 2.1 | 3.0 |
| XSIV/IV | | 0.51 | 0.50 | 0.48 | 0.43 | 0.39 | 0.50 | 0.34 |
| XSIV × XS/IV | | 6.1 | 4.9 | 5.6 | 4.1 | 3.5 | 5.8 | 2.7 |

What is claimed is:

1. A propylene terpolymer comprising comonomer units derived from ethylene and 2.5-15% by weight 1-butene, obtained by a process comprising the step of copolymerizing propylene and ethylene in the presence of a catalyst system comprising the product obtained by contacting the following components:

(a) a solid catalyst component comprising a magnesium halide, a titanium compound having at least a Ti-halogen bond and at least two electron donor compounds, one of which being present in an amount from 40-90% by mol with respect to the total amount of donors, wherein the first electron donor is selected from succinates and the second electron donor is selected from 1,3-diethers, (b) an aluminum hydrocarbyl compound, and
  (c) optionally an external electron donor compound;
  wherein the terpolymer has the following features:
    a. a melting temperature ($T_m$) higher than 120° C.;
    b. a sealing initiation temperature (SIT) ranging from 90-120° C.;
    c. $T_m$ and SIT satisfy the relationship:

$T_m-SIT>25°$ C.;

d. a melt flow rate (MFR; ISO 1133 (230° C., 2.16 kg) from 0.1-100 g/10 min;
    e. a xylene soluble fraction lower than 18 wt. %; and
    f. a hexane soluble fraction lower than 4.5 wt. %.

2. The terpolymer of claim 1 comprising: from 0.5-6% by weight of ethylene units.

3. The terpolymer of claim 2 further comprising: from 0.6-4% by weight of ethylene units and from 3.5-13% by weight of 1-butene units.

4. The terpolymer of claim 3 further comprising: from 0.7-3.5% by weight of ethylene units and from 5-11% by weight of 1-butene units.

5. The terpolymer of claim 1 further comprising forming the terpolymer into a film.

6. A process for the preparation of the propylene terpolymer of claim 1, comprising the step of copolymerizing propylene, ethylene and 1-butene in the presence of a catalyst system comprising the product obtained by contacting the following components:
   (a) a solid catalyst component comprising a magnesium halide, a titanium compound having at least a Ti-halogen bond and at least two electron donor compounds, one of which is present in an amount from 40-90% by mol with respect to the total amount of donors, wherein the first electron donor is selected from succinates and the second electron donor is selected from 1,3 diethers,
   (b) an aluminum hydrocarbyl compound, and
   (c) optionally an external electron donor compound.

7. The process of claim 6, wherein the succinate is of the formula (I):

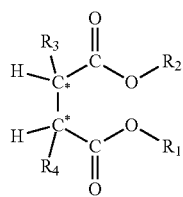

(I)

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, $C_3$-$C_{20}$ cycloalkyl, $C_5$-$C_{20}$ aryl, arylalkyl or alkylaryl group wherein at least one of them is a branched alkyl; said compounds being, with respect to the two asymmetric carbon atoms identified in the structure of formula (I), stereoisomers of the type (S,R) or (R,S).

8. The process of claim 6, wherein the 1,3-diether is of the formula (II):

(II)

wherein $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

* * * * *

UNITED STATES PATENT AND TRADEMARK OFFICE
CERTIFICATE OF CORRECTION

PATENT NO. : 9,650,458 B2
APPLICATION NO. : 14/774591
DATED : May 16, 2017
INVENTOR(S) : Monica Galvan et al.

It is certified that error appears in the above-identified patent and that said Letters Patent is hereby corrected as shown below:

In the Specification

| | | |
|---|---|---|
| Column 2 | Line 35 | After "(R,S)", insert --.-- |
| Column 2 | Line 36 | Delete "$R^1$ and $R^2$" and insert --$R_1$ and $R_2$-- |
| Column 2 | Line 36 | Delete "$C^1$-$C^8$" and insert --$C_1$-$C_8$-- |
| Column 2 | Line 38 | Delete "$R^1$ and $R^2$" and insert --$R_1$ and $R_2$-- |
| Column 2 | Line 40 | Delete "$R^1$ and $R^2$" and insert --$R_1$ and $R_2$-- |
| Column 2 | Line 43 | Delete "$R^3$" and insert --$R_3$-- |
| Column 2 | Line 44 | Delete "$R^4$" and insert --$R_4$-- |
| Column 3 | Line 2 | Delete "$C^1$-$C^{18}$" and insert --$C_1$-$C_{18}$-- |
| Column 3 | Line 4 | Delete "$C^1$-$C^{18}$" and insert --$C_1$-$C_{18}$-- |
| Column 3 | Line 11 | Delete "$R_I$" and insert --$R^I$-- |
| Column 3 | Line 18 | Delete "$R_I$ and $R_{II}$" and insert --$R^I$ and $R^{II}$-- |
| Column 4 | Line 15 | Delete "$R_v$" and insert --$R^V$-- |
| Column 4 | Line 20 | Delete "$R_v$" and insert --$R^V$-- |
| Column 4 | Line 22 | Delete "$R_{VI}$" and insert --$R^{VI}$-- |
| Column 4 | Line 26 | Delete "RV" and insert --$R^V$-- |
| Column 4 | Line 26 | Delete "$R_{VI}$" and insert --$R^{VI}$-- |
| Column 4 | Line 29 | Delete "$R_{III}$" and insert --$R^{III}$-- |
| Column 4 | Line 60 | Delete "RIII and RIV" and insert --$R^{III}$ and $R^{IV}$-- |
| Column 5 | Line 38 | Delete "8-octahydro fluorene;" and insert --8-octahydrofluorene;-- |
| Column 7 | Line 50 | Delete "(Tm)" and insert --($T_m$)-- |
| Column 7 | Line 54 | Delete "Tm" and insert --$T_m$-- |
| Column 7 | Line 55 | Delete "Tm-SIT>25" and insert --$T_m$-SIT>25-- |
| Column 7 | Line 60 | Delete "Tm-SIT>30" and insert --$T_m$-SIT>30-- |
| Column 7 | Line 64 | Delete "Tm-SIT>35" and insert --$T_m$-SIT>35-- |
| Column 8 | Line 33 | Delete "(Tm)" and insert --($T_m$)-- |
| Column 8 | Line 58 | Delete "(Tm)" and insert --($T_m$)-- |
| Column 9 | Line 11 | Delete "$_{13}$C-NMR" and insert --$^{13}$C-NMR-- |

Signed and Sealed this
Fourteenth Day of January, 2020

Andrei Iancu
*Director of the United States Patent and Trademark Office*

CERTIFICATE OF CORRECTION (continued)
U.S. Pat. No. 9,650,458 B2

| | | |
|---|---|---|
| Column 9 | Line 29 | Delete "$_{13}$C-NMR" and insert --$^{13}$C-NMR-- |
| Column 9 | Line 64 | Delete "XSIV/W>0.40" and insert --XSIV/IV>0.40-- |
| Column 10 | Line 56 | Delete "(Tm)" and insert --($T_m$)-- |
| Column 11 | Line 26 | Delete "kg/cm2" and insert --kg/cm$^2$-- |
| Column 11 | Line 30 | Delete "(cm-1)." and insert --(cm$^{-1}$).-- |
| Column 11 | Line 33 | Delete "(At)" and insert --($A_t$)-- |
| Column 11 | Line 36 | Delete "(AC2)" and insert --($A_{C2}$)-- |
| Column 11 | Line 42 | Delete "(DC4)" and insert --($D_{C4}$)-- |
| Column 11 | Line 53 | Delete "AC2/At" and insert --$A_{C2}/A_t$-- |
| Column 11 | Line 54 | Delete "GC2" and insert --$G_{C2}$-- |
| Column 11 | Line 57 | Delete "DC4/At" and insert --$D_{C4}/A_t$-- |
| Column 11 | Line 58 | Delete "GC4" and insert --$G_{C4}$-- |
| Column 11 | Line 60 | Delete "(At)," and insert --($A_t$),-- |
| Column 11 | Line 60 | Delete "(AC2)" and insert --($A_{C2}$)-- |
| Column 11 | Line 60 | Delete "(DC4)" and insert --($D_{C4}$)-- |
| Column 12 | Line 25 | Delete "$^{13}$C NMR" and insert --$^{13}$C-NMR-- |
| Column 13 | Line 5 | Delete "$^{13}$C NMR" and insert --$^{13}$C-NMR-- |
| Column 13 | Line 20 | Delete "(Tm)" and insert --($T_m$)-- |
| Column 15 | Line 7 | In Table 2, delete "(Tm)" and insert --($T_m$)-- |
| Column 16 | Line 11 | Delete "32+36" and insert --32÷36-- |
| Column 16 | Line 56 | Delete "TiCl4" and insert --TiCl$_4$-- |
| Column 17 | Line 14 | In Table 3, delete "1st" and insert --1$^{st}$-- |
| Column 17 | Line 20 | In Table 3, delete "2nd" and insert --2$^{nd}$-- |
| Column 17 | Line 6 | In Table 4, delete "(Tm)" and insert --($T_m$)-- |